(12) United States Patent
Miller (10) Patent No.: US 7,142,648 B1
(45) Date of Patent: Nov. 28, 2006

(54) SYSTEM FOR SECURING MESSAGES RECORDED IN AN IP TELEPHONY NETWORK

(75) Inventor: Eric Miller, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 349 days.

(21) Appl. No.: 10/626,786

(22) Filed: Jul. 23, 2003

(51) Int. Cl.
*H04M 1/64* (2006.01)

(52) U.S. Cl. .................. 379/88.23; 235/380; 380/257; 705/51; 709/206; 713/156

(58) Field of Classification Search ............ None
See application file for complete search history.

(56) References Cited

U.S. PATENT DOCUMENTS

| | | | |
|---|---|---|---|
| 5,710,816 A * | 1/1998 | Stork et al. ............. | 380/257 |
| 5,870,549 A | 2/1999 | Bobo, II | |
| 6,233,318 B1 | 5/2001 | Picard et al. | |
| 6,400,806 B1 | 6/2002 | Uppaluru | |
| 6,741,705 B1 * | 5/2004 | Nelson et al. ........... | 380/257 |

FOREIGN PATENT DOCUMENTS

WO    01/65808    9/2001

OTHER PUBLICATIONS

ContentGuard, *XrML 2.0 Technical Overview*, Version 1.0, Mar. 8, 2002, pp. 1-24.

* cited by examiner

*Primary Examiner*—Gerald Gauthier (57) ABSTRACT

A network apparatus communicates a recorded message from a calling party to a called party. A messaging controller accepts commands from the calling party and plays and records digital media including the recorded message. An encryption encoder/packager is coupled to the message controller for encrypting the recorded message in response to an encryption key and for packaging the encrypted recorded message with an identifier to produce a protected message file. A notification system sends a notification message for the called party to announce the protected message file. A message distributor delivers the protected message file to the called party when requested by the called party. A license server maintains the encryption key and the identifier and responds to a validated request for a license from the called party, wherein the validated request includes the identifier, and wherein the license includes a decryption key for accessing the protected message file.

26 Claims, 7 Drawing Sheets

SYSTEM FOR SECURING MESSAGES RECORDED IN AN IP TELEPHONY NETWORK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to recording messages for a called party in a telephony system, and, more specifically, to restricting usage of recorded message files transferred within computer networks, such as an Internet Protocol (IP) network for providing IP telephony.

IP telephony is increasingly being used as the basis for telephonic communication. In addition to IP telephony calls made between networked personal computers, calls originating in the plain old telephone system (POTS) can be transported over IP networks using gateways between the public switched telephone network (PSTN) and the IP network (e.g., the Internet). IP telephony services can provide the same enhanced services that are available in a typical POTS system, such as voice mail.

When a call is made, resources in the IP network determine the address of a network location associated with the called party and establish a network session for exchanging data signals between the calling and called parties. The Session Initiation Protocol (SIP) can be used for collecting information necessary to create such a network session. A registration/location server typically provides a database of user information that may be consulted during a call set-up. The user information can be dynamically configured so that calls for a particular called party can be directed in a variety of ways. For example, a party can indicate to the location server that he/she is temporarily unavailable for receiving a call and that any incoming calls should be directed to a voice mail service for allowing a calling party to record an audio or video message for the called party. In addition, calls can be directed to the voice mail service when an incoming call initially connected to the called party's current location goes unanswered.

When an audio or video message has been recorded during a SIP-initiated communication session, the resulting multimedia file has been stored in a format ready for playback to the called party. For example, audio .wav files or video .mpg files have been created for a subsequent transfer or download to the called party via the IP network during message retrieval. File streaming can also be used to speed up the replaying of the message (e.g., transmitting packets of a streaming .wma, .wmv, or .asf file from a streaming server).

Existing SIP messaging systems require the called party to authenticate with a password or other security measure to ensure that the only the intended recipient(s) receive messages within a particular voice mailbox of a called party. However, the message files themselves are not protected. Once access to the mailbox is obtained, the message files can be copied, altered, or distributed to others without limitation. Since the message file already resides in an IP computer network, the alteration or forwarding of a message file is easily done. These uses of the recorded message may be contrary to the intention or desires of the calling party that created the message. For example, the sender of a message cannot ensure that the called party will not forward a confidential message to others.

SUMMARY OF THE INVENTION

The present invention has the advantage of providing a calling party leaving a message within an IP telephony system with control over the listening to and forwarding of the message.

In one aspect of the invention, a network apparatus is provided for communicating a recorded message from a calling party to a called party. A messaging controller accepts commands from the calling party and plays and records digital media including the recorded message. An encryption encoder/packager is coupled to the message controller for encrypting the recorded message in response to an encryption key and for packaging the encrypted recorded message with an identifier to produce a protected message file. A notification system sends a notification message for the called party to announce the protected message file. A message distributor delivers the protected message file to the called party when requested by the called party. A license server maintains the encryption key and the identifier and responds to a validated request for a license from the called party, wherein the validated request includes the identifier, and wherein the license includes a decryption key for accessing the protected message file.

DETAILED DESCRIPTION OF PREFERRED EMBODIMENTS

The Secure SIP Media Server (SSMS) of the present invention provides for the recording and distribution of stored audio and video messages or other content while maintaining the ability of the owner/creator of the message to control usage of the content by others. Conventional SIP-based messaging systems provide the ability to record live audio or video messages destined for users who are not currently available for interactive communications. However, the current systems cannot guarantee how the recipient of the message handles it. For instance, once a called party retrieves a stored message using email, that user could forward the message on to another email recipient, or could modify the original message. This behavior may not be in accord with the behavior intended by the original sender.

Using digital rights management (DRM) technology, the SSMS enhances both the calling party's and the called party's control over a message even after it has been forwarded to another user. Stored messages are encrypted and assigned usage rights by both the calling and called parties. The rights may specify users that may access or modify the content as well as how often and when the content may be accessed.

Figure 1:
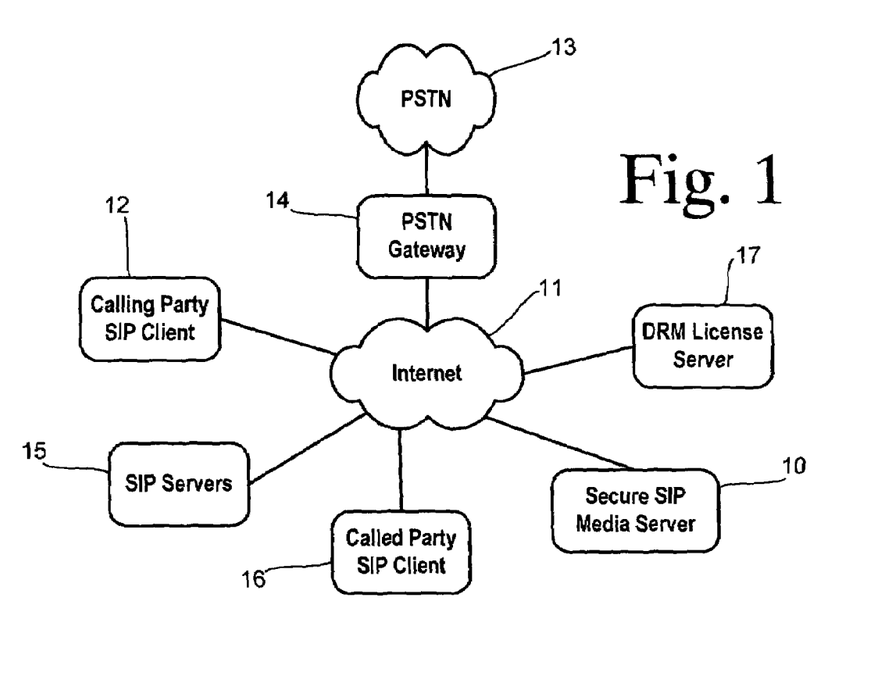
FIG. 1 is a block diagram showing an Internet architecture including the secure message recording of the present invention.

Referring to FIG. 1, a secure SIP media server 10 is coupled to an internetwork, such as the Internet 11, for providing a messaging service within an IP telephony system. IP telephony calls may be initiated to a desired, called party from a calling party within the internetwork using a SIP client 12 of a calling party, or may be initiated from a conventional telephone within PSTN 13 through a PSTN gateway 14 as is known in the art.

SIP servers 15 include a registrar/locator service as well as either a proxy server or a redirect server for setting up a network session between the calling party and either a called party SIP client 16 where the called party is available or secure SIP media server 10 for recording a message when the called party is unavailable.

The present invention applies digital rights management (DRM) techniques for the purpose of protecting a recorded message. Thus, a DRM license server 17 is coupled to Internet 11 for creating and distributing license files as is described below in connection with FIGS. 3–5.

Figure 2:
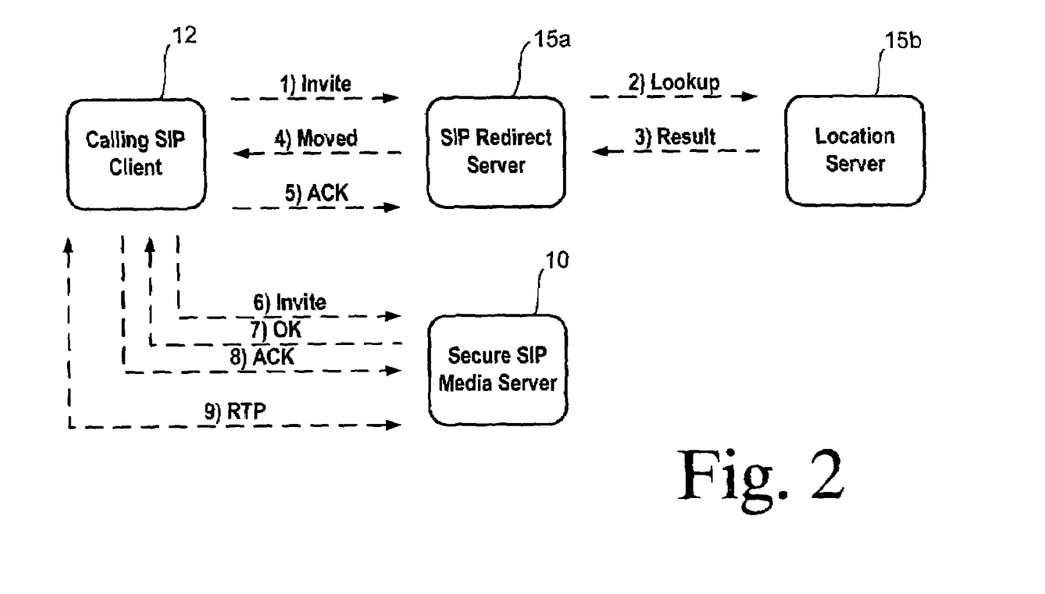
FIG. 2 is a block diagram showing message flow during the initiation of a network session between a calling party and the secure media server of the present invention.

FIG. 2 illustrates message flow during the initiation of a network session between a calling party and the secure media server when the called party is unavailable (e.g., the called party has configured their IP telephony service such that they have an out-of-office status or the called party is already engaged in a call). As a first step, calling SIP client 12 sends an SIP Invite message to SIP redirect server 15a. The Invite message includes an address identifier of the called party, such as a telephone number or a user name and domain name (e.g., user1@(sprint.com). In step 2, redirect server 15a sends an SIP Lookup message to an SIP location server 15b. Location server 15b consults its user database and provides an SIP Result message to redirect server 15a in step 3. The Result message includes an address (such as an IP address or a voice mail system user name and a domain name such as user1@vm.sprint.com) for directing the call attempt. In the present embodiment, location server 15b notifies redirect server 15a that the called party is unavailable but that they have a media mailbox that can be reached at the alternate address provided in the Result message.

In step 4, redirect server 15a sends a "temporarily moved" message to SIP client 12 and receipt of the message is acknowledged by SIP client 12 is step 5. Using the alternate address from the "temporarily moved" message, SIP client 12 sends an SIP Invite message to secure SIP media server 10 in step 6. SIP media server 10 recognizes the user specified by the address and sends an accept or "OK" message to SIP client 12 in step 7. SIP client 12 sends an acknowledgement message in step 8. In step 9, a real-time transport protocol (RTP) session is established between SIP client 12 and secure SIP media server 10 which persists during the recording of a message by the calling party. Other protocols could be used in the present invention, but RTP is currently the most widely accepted protocol for sessions of this type.

Figure 3:
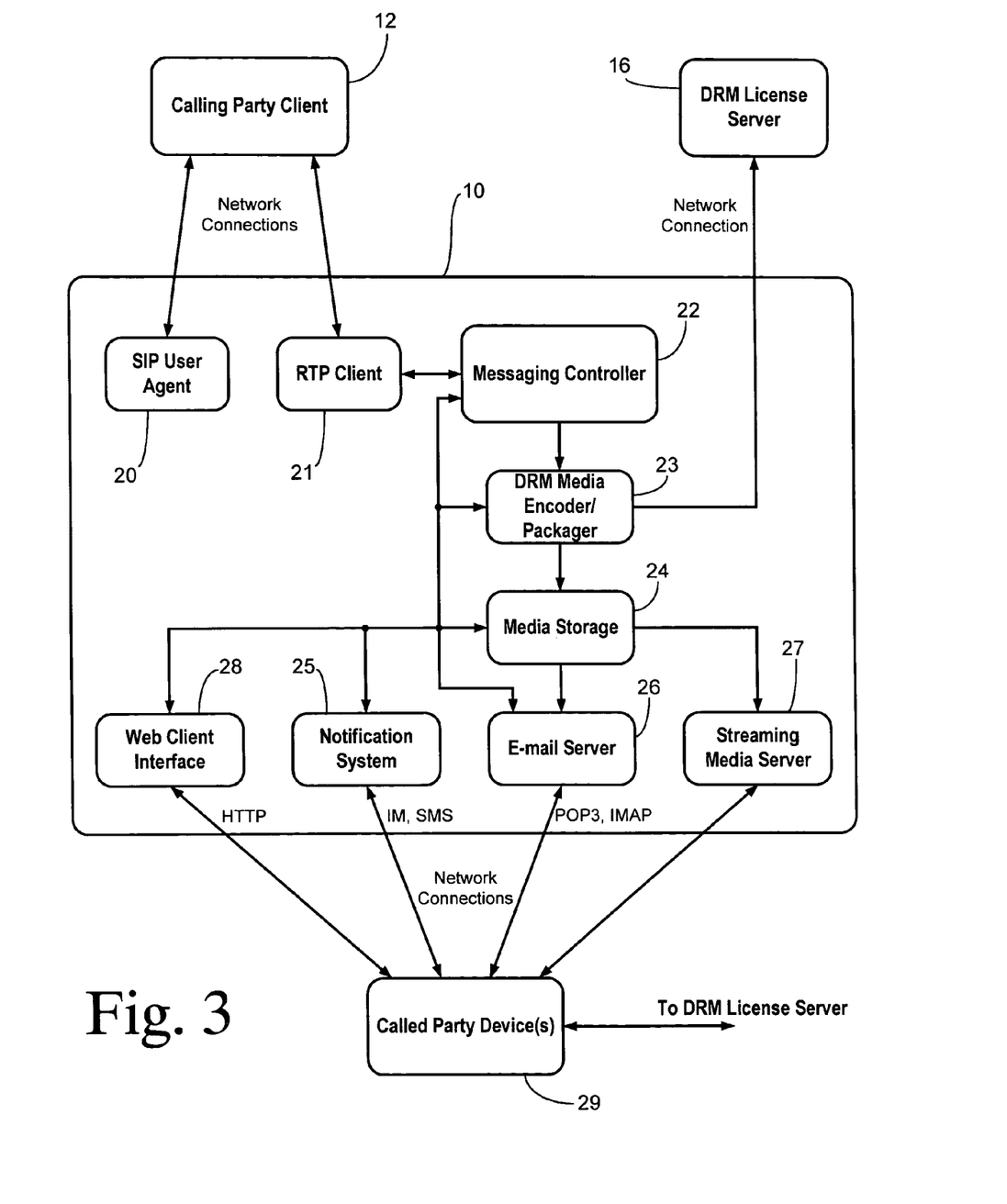
FIG. 3 is a block diagram showing the secure media server in greater detail.

FIG. 3 shows secure SIP media server 10 in greater detail. A SIP user agent 20 and an RTP client 21 establish/terminate SIP and RTP sessions, respectively, over the network with other clients such as calling party client 12. A messaging controller 22 handles DTMF control tones entered by the calling party and plays audio prompts and records audio and/or video messages within the RTP session established by RTP client 21. Messaging controller 22 is connected to most other components in secure SIP media server 10 for controlling its overall operation. Messaging controller 22 may include an intelligent voice response (IVR) unit, for example.

A DRM media encoder/packager 23 receives recorded messages or content from messaging controller 22 (e.g., in the form of a .wav file, a .wma file, or a .wmv file) and encrypts the recorded messages using an encryption key. The encryption key can be randomly generated from a key seed, for example. A unique identifier, such as a key identifier or a content identifier, is also generated to identify the encryption key that was used during the encryption. Depending upon the DRM system being used, DRM encoder/packager 23 may also apply the desired rights (i.e., usage rules) within the encrypted file itself. Preferably, the encrypted file may be decrypted using the same key as was used for encryption, but different keys may be used depending upon the type of encryption being employed. The encrypted message is packaged with the identifier to produce a protected message file which is stored in a media storage 24.

DRM encoder/packager 23 communicates via the network with DRM license server 16. Default usage rights associated with messages recorded by the calling party may be stored within DRM license server 16, for example, and may be retrieved by DRM encoder/packager 23 during the encoding process. The encryption key and the corresponding identifier is transmitted from DRM encoder/packager 23 to DRM license server 16 to enable licenses to be subsequently issued (e.g., to the called party).

After the protected message file is available in media storage 24, a notification system 25 is activated by messaging controller 22 in order to send a notification message to a called party device 29. Notification system 25 is preconfigured to communicate via the network with called party device 29, which may comprise a networked computing device for receiving an instant message via an instant messaging (IM) service or a mobile telephone for receiving a text message via a short message service (SMS), for example. The notification message preferably contains a network hyperlink or other information for retrieving the protected message file.

After notification to the called party, a message can be retrieved using distribution components of secure SIP media server 10 including an e-mail server 26, a streaming media server 27, and a web client interface 28. E-mail server 26 is coupled to media storage 24 for creating an e-mail message for the called party having the protected message file as an e-mail attachment. The called party can log on to e-mail server 26 from device 29 in order to retrieve the e-mail and attachment. E-mail server 26 can also function as part of notification system 25 by sending a notification message via e-mail, wherein the e-mail message contains the network hyperlink for retrieving the protected message file.

Another embodiment for delivering a protected message file employs streaming media server 27 connected to media storage 24. Called party device 29, such as a personal computer, contacts streaming media server 27 using the network address hyperlink provided in the notification message to initiate streaming of the protected message file.

Yet another embodiment for delivering a protected message file employs web client interface 28 containing HTTP web pages for accessing the voice mail system. Called party device 29, such as a personal computer, browses web client interface 28 to locate web pages having links to protected message files corresponding to the currently stored messages. By activating a link, called party device 29 downloads the respective file (or a link to a streaming version of the file). Web client interface 28 may also include web pages for configuring a called party's voice mail box, for setting the called party's out-of-office status, and for other functions. Management of default rights for a calling party or a called party or the rights to be applied to a specific already recorded message can also be performed via web client interface 28, assuming that the person attempting to control such rights has proper authorization within the messaging system.

Called party device 29 communicates with DRM license server 16 via the network for obtaining a license (e.g., decryption key and usage rights) for accessing the protected message file, as will be described below.

Figure 4:
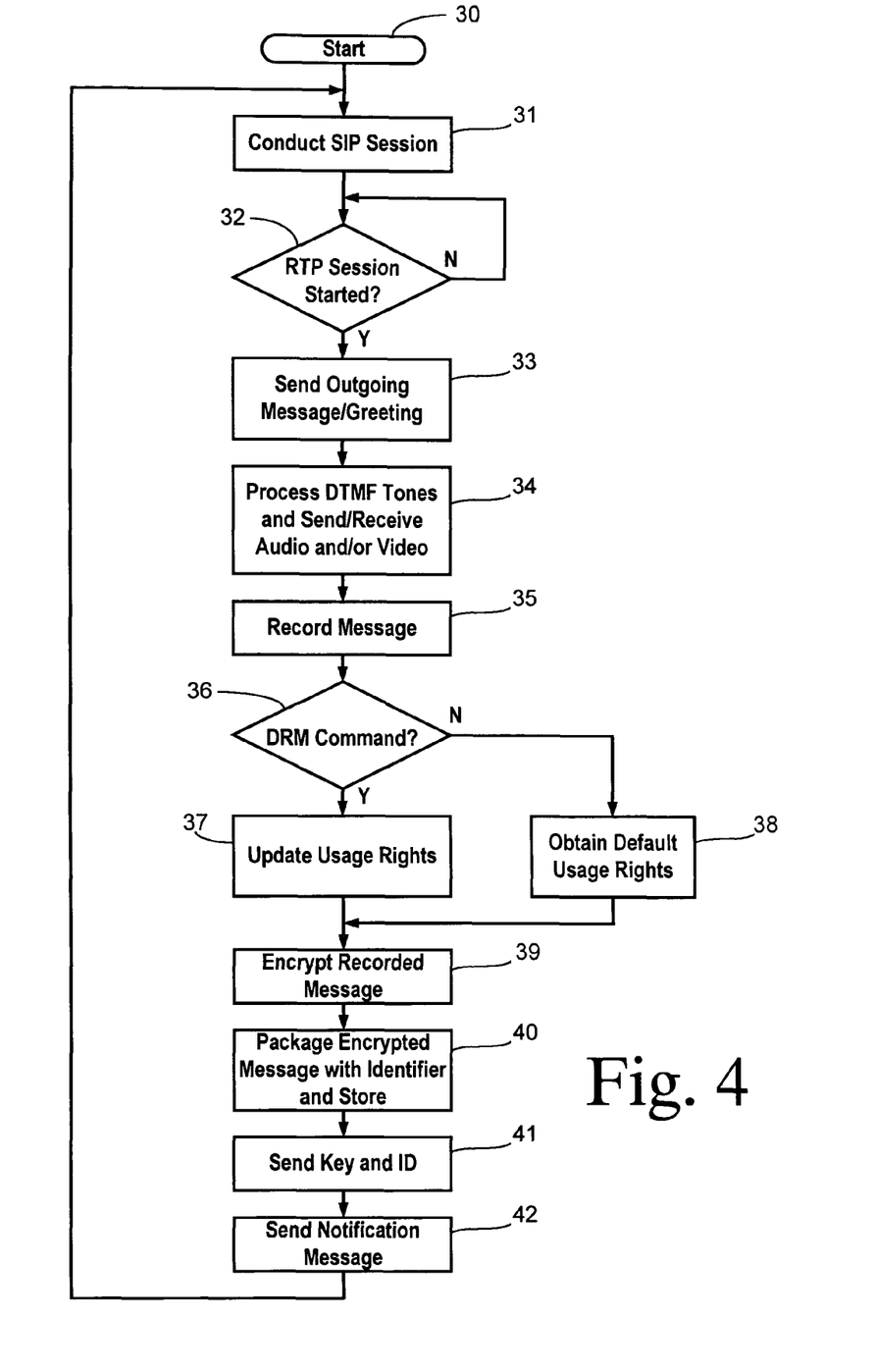
FIG. 4 is a flowchart showing one preferred embodiment of a method for recording and protecting a message.

FIG. 4 shows a preferred embodiment of a method performed by the secure SIP media server for recording a message starting at step 30. In step 31, an SIP session is conducted with a SIP client of a calling party. A check is made in step 32 for the initiation of an RTP session with the calling party. If not yet initiated, then continual rechecks are made. Once an RTP session is detected, the secure SIP media server sends an outgoing message or greeting to the calling party in step 33. The greeting may preferably include 1) a recording of the called party speaking their name and brief instructions, and 2) a menu of voice prompts from the IVR unit for assisting the calling party in leaving a recorded message or entering commands. In step 34, DTMF commands (e.g., initiated from a real or a software-generated telephone keypad) are processed and various audio and/or video content is sent and received. A message intended for the called party is recorded in step 35.

A check is made in step 36 to determine whether a digital rights command has been entered by the calling party (e.g., for specifying the desired usage rights to be associated with the recorded message). If yes, then the usage rights to be applied are gathered from the calling party and the usage rights assigned to the recorded message are updated in step 37. If no DRM command is detected in step 36 then default usage rights are obtained in step 38 (e.g., by looking up the default usage rights corresponding to the calling party and/or the called party, as stored by the DRM license server).

The recorded message is encrypted in step 39 and then packaged with the key identifier and stored in step 40. The key identifier and the encryption/decryption key are sent to the DRM license server in step 41. Lastly, a notification message is sent to the called party in step 42.

Figure 5:
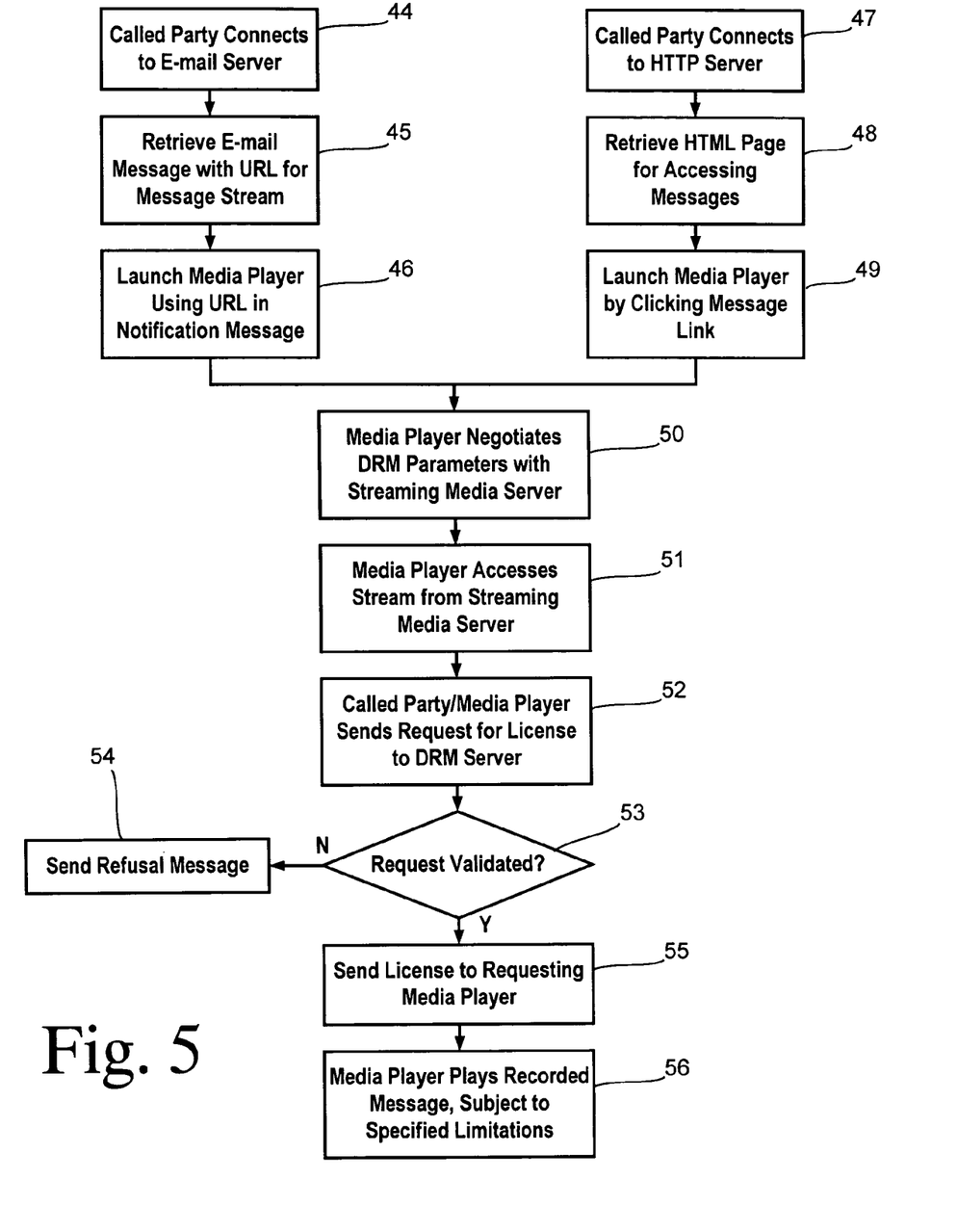
FIG. 5 is a flowchart showing preferred embodiments of a method for a called party to retrieve a protected message.

Two alternative methods for retrieving a message are shown in FIG. 5. The called party connects to the SSMS e-mail server in step 44 (e.g., in response to an instant message that a message is present in the called party's e-mail in-box). In step 45, the e-mail message is retrieved by logging on to the e-mail server. The protected message file may be included as an e-mail attachment, or the e-mail message may include a uniform resource locator (URL) address for obtaining the protected message file as a stream from the streaming media server, for example. In step 46, the called party opens the protected message file, e.g., by opening the downloaded file attachment or accessing the URL given in the notification message or e-mail message. In either case, the opening of the file automatically launches a media player on the called party's computing device for playing the protected message file.

In an alternative method, the called party connects to the SSMS web client interface in step 47 (e.g., in response to an instant message). In step 48, a web browser running on the called party's computing device navigates to an HTML page for accessing pending messages. The address or URL of the page is preferably preconfigured in the web browser. Each pending message is preferably shown on the HTML web page as a link to either a downloadable file or as a streaming copy of the protected message file. In step 49, the called party opens the protected message file, e.g., by opening the downloaded file or clicking the URL in the message link on the web page. In either case, the opening of the file automatically launches a media player on the called party's computing device for playing the protected message file. After the media player is launched, it negotiates DRM parameters (such as DRM type) with the streaming media server in step 50 so that a DRM method supported by both the media player and the media server is identified. In step 51, the media player accesses the streamed protected message file from the streaming media server. The packaged file in the stream includes the identifier (e.g., key identifier) that needs to be given to the DRM license server so that the necessary decryption key can be identified. For example, the streamed file may include a file header containing the key identifier. In step 52, the media player of the called party sends a request for a license to the DRM license server. The request includes the key identifier so that it can identify the target message and the requirements for obtaining a license (e.g., the identity of the called party). In response to the request, a challenge-response process is initiated for validating the request. For example, the called party may be required to provide a user name and password to the DRM license server in order to validate the request. Any known type of authentication and authorization may also be used in validating a request.

A check is made in step 53 to determine whether the request is validated. If not, then a refusal message is sent in step 54 and the media player fails to reproduce the message. If the request is validated, then the DRM license server sends a license to the requesting media player in step 55. The license includes the decryption key and the specified usage rights (e.g., limitations as to how many times the message can be played or whether or not forwarding or modification of a message is allowed). In step 56, the media player decrypts and plays the recorded message subject to the limitations specified by the usage rights.

In one preferred embodiment, Microsoft Windows Media 9 Series digital rights management applications, tools, and specifications are used, although any DRM system can be used in the present invention. Files may be encrypted using Windows Media Rights Manager and played back using Windows Media Player version 9. The DRM license server preferably uses the Windows Media License Service.

When a media player contacts a streaming media server to negotiate DRM parameters via respective SIP clients, the session description protocol (SDP) may be used as supplemented by the following extensions. A DRM attribute is provided to allow an offerer to tell an answerer, which DRM methods it can support. Likewise, a DRM attribute in an answer tells the offerer which DRM methods the answerer can support. The format for a DRM attribute is:

a=drm:<drm type><address><port><transport>

The "type" field denotes the LANA reserved DRM type name. The "address" field is the network address of the DRM license server. Port is the port used to access the DRM application. Transport is the transport method used to exchange DRM data.

Each DRM offer must have a corresponding DRM answer. If the answerer does not support a particular DRM offer, the answerer returns a value of zero for the attribute fields. Each offer must be in order of preferred acceptance. The offer must use an address of 0 and a port of 0 so that the answerer does not try to connect to the offerer.

An example of a DRM offer/answer is given below.

SDP Offer v=0 o=alice 1234567890 1234567891 IN IP4 computer.somedomain.com s= c=IN IP4 computer.somedomain.com t=0 0 a=drm:opendrm 0 0 HTTP/TLS a=drm:fastdrm 0 0 HTTP/TLS a=drm:fastdrm 0 0 LDAP/SSL m=audio 45000 RTP/AVP 0 a=rtpmap:0 PCMU/8000 a=receiveonly

SDP Answer v=0 o=voicemail 1234567895 1234567896 IN IP4 computer2.someotherdomain.com s= c=IN IP4 computer2.someotherdomain.com t=0 0 a=drm:0 0 0 0 a=drm:fastdrm license.someotherdomain.com 80 HTTP/TLS a=drm:fastdrm license.someotherdomain.com 636 LDAP/SSL m=audio 43000 RTP/AVP 0 a=rtpmap:0 PCMU/8000 a=sendonly

Figure 6:
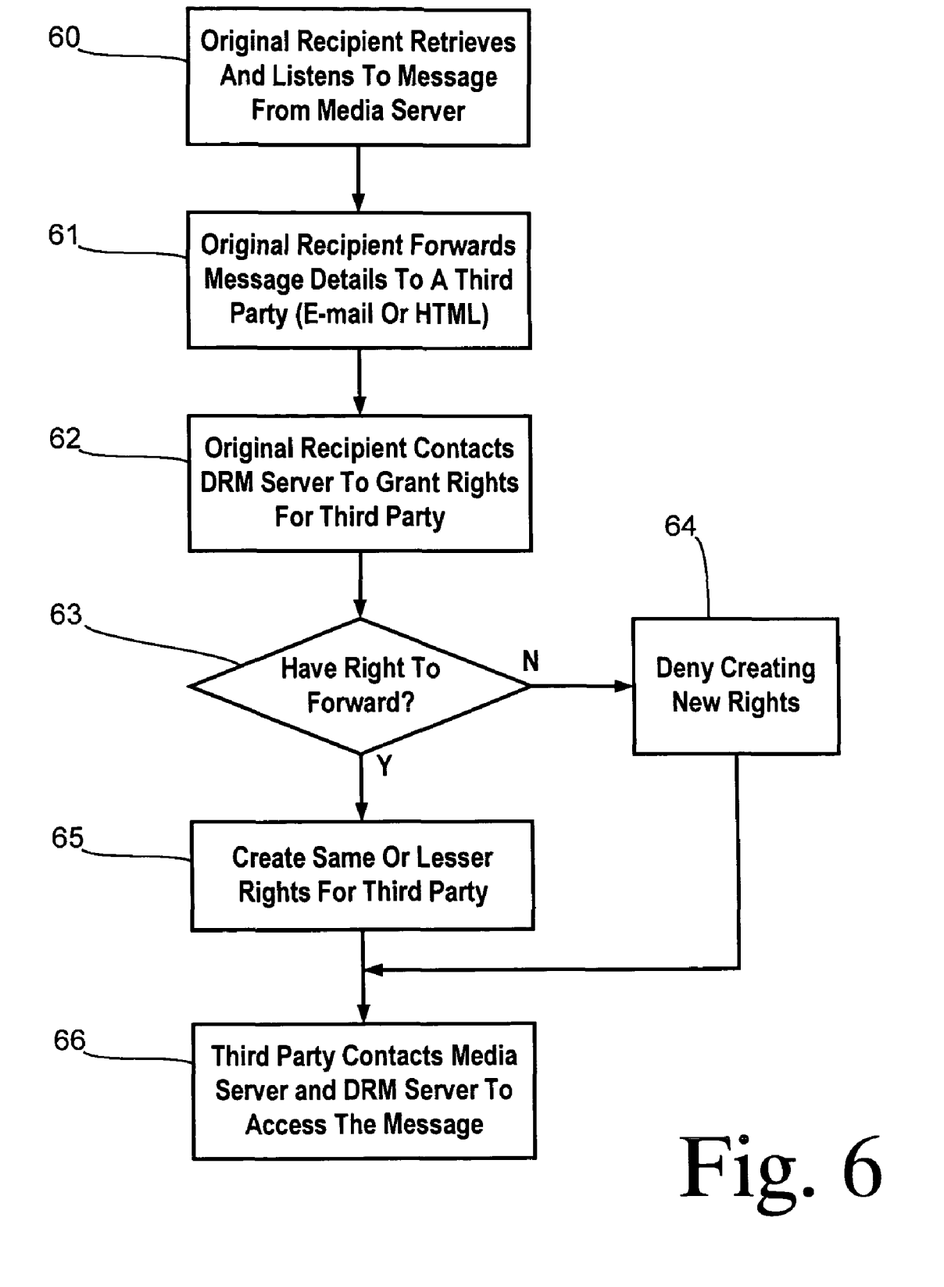
FIG. 6 is a flowchart showing a preferred method of forwarding protected messages.

Protected messages can be shared by the recipient with third parties using the method shown in FIG. 6, for example. In step 60, the original message recipient retrieves and listens to a message from the secure SIP media server. In order to share the message, the original recipient forwards message details to the third party (e.g., via an e-mail or by creating an HTML web page to be accessed by the third party). Alternatively, the protected message file itself could be sent to the third party. In step 62, the original recipient authenticates with the DRM server in order to arrange for rights to be recognized for the third party.

In step 63, the DRM server checks whether the original recipient has sufficient rights to forward the message to the third party. If the original recipient does not have such rights, then the request to create new rights is denied in step 64. Otherwise, the original recipient creates rights for the third party in step 65. The newly created rights can be same as or lesser than the rights possessed by the original recipient (i.e., no greater than the rights originally given out by the party that created the message). In step 66, the third party contacts the media server (in the embodiment where the third party is given a URL for accessing the streaming file) and the DRM server in order to access the message. If no rights were created for the third party or if the third party does not successfully authenticate with the DRM server, then no license will be provided and the third party will not be able to access the protected message.

Figure 7:
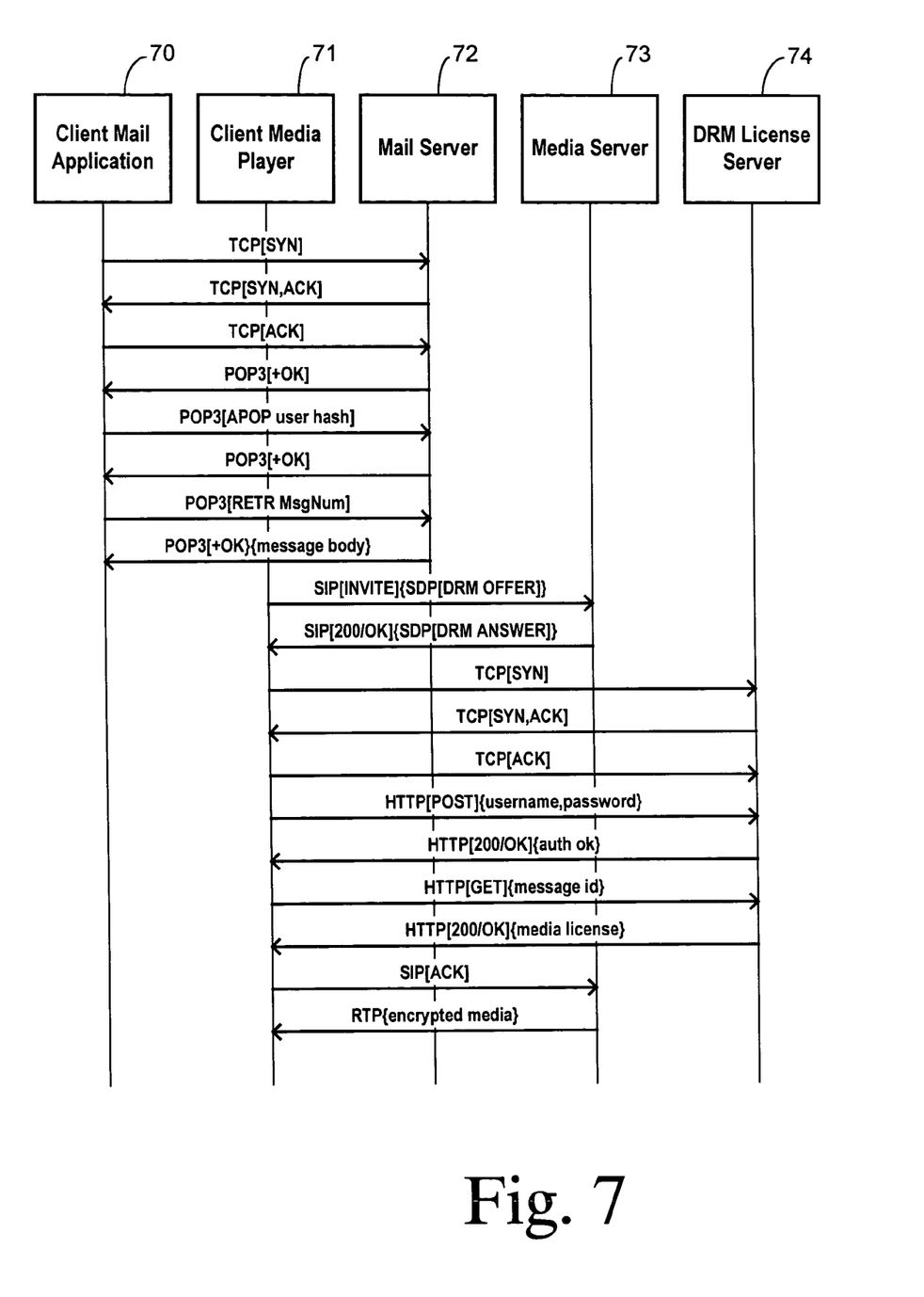
FIG. 7 shows an IP message sequence involved when the original recipient or a third party accesses a protected message via e-mail.

FIG. 7 shows an IP message sequence involved when either the original recipient or a third party accesses a protected message via e-mail, i.e., when the recipient is informed of a URL for accessing the protected message within a streaming media server. The interacting components include a client mail application 70, a client media player 71, a mail server 72, a streaming media server 73, and a DRM license server 74. The client retrieves an e-mail message that contains a SIP URL for accessing the recorded media message as follows:

Client mail application 70 establishes a TCP connection to mail server 72 using standard mail protocols (POP3 for example).

Mail server 72 sends a greeting.

Client mail application 70 sends authentication credentials (e.g., user hash).

Mail server 72 acknowledges successful authentication.

Client mail application 70 sends a message retrieval command.

Mail server 72 sends the e-mail message containing the SIP URL for the recorded voicemail message.

In the next phase of retrieval, client media player 71 negotiates with media server 73 to determine the type of DRM protection that must be used to access and operate on the recorded media as follows:

Client media player 71 sends a SIP INVITE to media server 73 containing a DRM OFFER primitive (using SDP for formatting). The SIP address used for the INVITE is extracted from the e-mail message previously downloaded, and contains a unique identifier for the message to be played as well as the username for the mailbox that the message is stored in. An sample format for the SIP address is: username.messageid@mediaserver.com.

Media server 73 acknowledges the INVITE by sending a 200/OK that contains a DRM ANSWER primitive. Client media player 71 delays sending the SIP ACK until completion of DRM license retrieval for the media. If client media player 71 does not send the authentication credentials in the INVITE, media server 73 must send a 407/Authentication Required to force authentication.

Client media player 71 then retrieves a license for the recorded media using the DRM protocol above as follows:

Client media player 71 establishes a TCP connection to license server 74 using the negotiated protocol (e.g., HTTP).

Client media player 71 sends a HTTP/POST containing its authentication credentials.

License server 74 acknowledges the successful authentication of the client.

Client media player 71 sends an HTTP/GET to retrieve the license for the "messageid" extracted from previous e-mail message.

License server 74 sends the license to be used for accessing the recorded message media.

In the next phase of the retrieval, client media player 71 completes the SIP transaction and begins receiving the recorded media as follows:

Client media player 71 sends the SIP ACK, completing the session initiation transaction with the media server. The media server is now free to begin sending the recorded media.

Media server 72 begins transmitting the encrypted recorded message. Client media player 71 uses the retrieved license to decrypt the media and operate on it using the methods permitted by the license.

Figure 8:
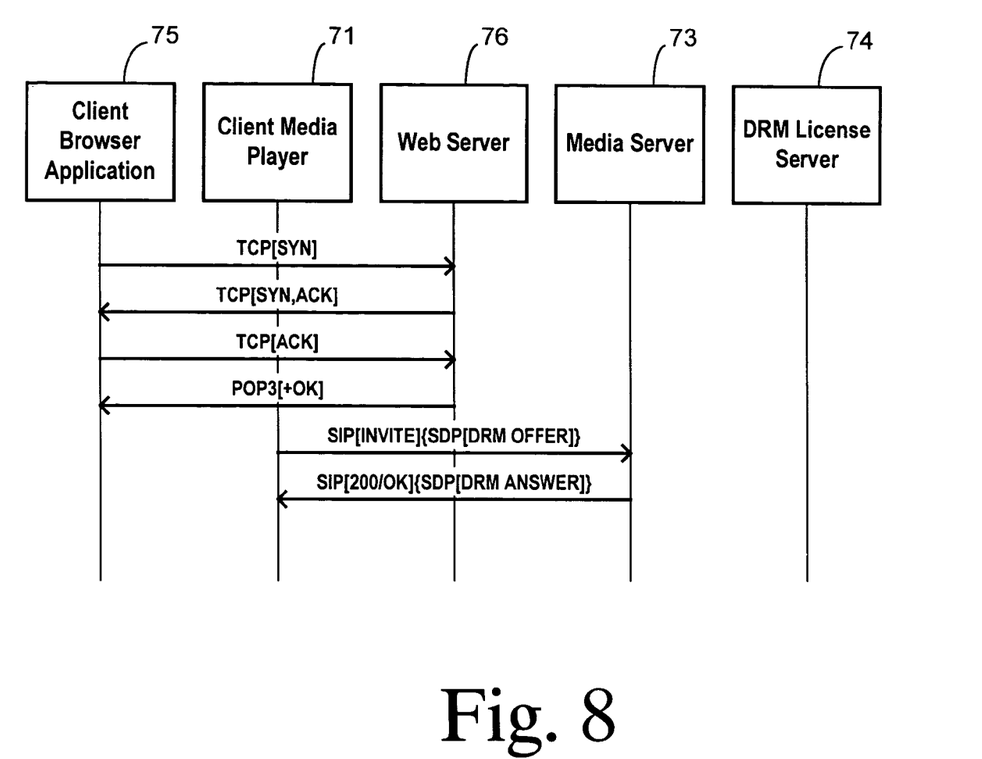
FIG. 8 shows a portion of an IP message sequence involved when the original recipient or a third party accesses a protected message via an HTML web page.

FIG. 8 shows a modified method wherein the SIP URL is obtained via an HTML web page (e.g., a web page included in a browsable interface to a voice mail system). For this retrieval, the components include a client browser application 75, client media player 71, web server 76, media server 73, and DRM license server 74. Thus, client browser application 75 establishes a TCP connection to web server 76. Application 75 then sends an HTTP/GET message to retrieve the HTML page. Web server 76 sends an HTTP 200/OK response with the HTML page containing a SIP URL for accessing the recorded media. Once the user selects a link to the SIP URL, subsequent operation is as shown in the last half of FIG. 7.

What is claimed is:

1. Network apparatus for communicating a recorded message from a calling party to a called party within an Internet Protocol (IP) network, comprising:
    a messaging controller for accepting commands over said IP network from said calling party, said messaging controller playing and recording digital media including said recorded message;
    an encryption encoder/packager coupled to said message controller for encrypting said recorded message in response to an encryption key and packaging said encrypted recorded message with an identifier to produce a protected message file;
    media storage for storing said protected message file;
    a notification system for sending a notification message over said IP network for said called party to announce said protected message file;
    a message distributor for delivering said protected message file from said media storage to said called party over said IP network when requested by said called party; and
    a license server for maintaining a decryption key corresponding to said encryption key and said identifier and for responding to a validated request over said IP network for a license from said called party, wherein said validated request includes said identifier, and wherein said license includes said decryption key for accessing said protected message file.

2. The apparatus of claim 1 wherein said messaging controller identifies license parameters for providing selected limitations for accessing said protected message file.

3. The apparatus of claim 2 wherein said license parameters are maintained by said license server for inclusion in said license.

4. The apparatus of claim 2 wherein said license parameters are incorporated into said protected message file.

5. The apparatus of claim 2 wherein said messaging controller is responsive to respective commands from said calling party for specifying said selected limitations.

6. The apparatus of claim 2 wherein said selected limitations include default limitations associated with at least one of said called party and said calling party.

7. The apparatus of claim 1 wherein said identifier comprises a key identifier for uniquely identifying said decryption key.

8. The apparatus of claim 1 further comprising:
    a user agent for establishing a communication session within said IP network between said calling party and said messaging controller; and
    a transfer client for exchanging communication signals to and from said calling party.

9. The apparatus of claim 1 wherein said notification message is sent to an instant message client.

10. The apparatus of claim 1 wherein said notification message is sent to a short message service (SMS) device.

11. The apparatus of claim 1 wherein said notification message is sent to an e-mail client.

12. The apparatus of claim 1 wherein said message distributor comprises an e-mail server for providing said protected message file as an e-mail attachment.

13. The apparatus of claim 1 wherein said message distributor comprises a streaming media server, wherein said notification message provides a stream identification, and wherein said streaming media server streams said protected message file in response to being contacted by a media player.

14. A method of sharing a recorded message from a calling party, said recorded message being stored and transmitted within an Internet Protocol (IP) network, said method comprising the steps of:
    placing a call from said calling party to a called party over said IP network;
    determining that said called party is not available for said call;
    interconnecting said call with a message service over said IP network;
    recording said recorded message as an unprotected digital media file;
    encrypting said unprotected digital media file according to an encryption key to generate an encrypted recorded message;
    packaging said encrypted recorded message with an identifier to produce a protected message file;
    storing said protected message file in media storage;
    sending a notification message to said called party over said IP network to announce said protected message file;
    delivering said protected message file to said called party over said IP network when requested by said called party; and
    responding to a validated request over said IP network for a license from said called party by transmitting said license to said called party over said IP network, said license including a decryption key for accessing said protected message file.

15. The method of claim 14 further comprising the step of identifying license parameters for providing selected limitations for accessing said protected message file.

16. The method of claim 15 wherein said license parameters are maintained by said license server for inclusion in said license.

17. The method of claim 15 wherein said packaging step includes incorporating said license parameters into said protected message file.

18. The method of claim 15 further comprising the step of said calling party generating respective commands for specifying said selected limitations.

19. The method of claim 15 wherein said selected limitations include default limitations associated with at least one of said called party and said calling party.

20. The method of claim 14 wherein said identifier comprises a key identifier for uniquely identifying said encryption key.

21. The method of claim 14 further comprising the steps of:
launching a user agent for establishing a communication session within said IP network between said calling party and said messaging controller; and
launching a transfer client for exchanging communication signals to and from said calling party.

22. The method of claim 14 wherein said step of sending a notification message comprises sending an instant message to an instant message client corresponding to said called party.

23. The method of claim 14 wherein said step of sending a notification message comprises sending an SMS message to an short message service device corresponding to said called party.

24. The method of claim 14 wherein said step of sending a notification message comprises sending an e-mail message to an e-mail server corresponding to said called party.

25. The method of claim 14 wherein said step of delivering said protected message file comprises sending said protected message file from an e-mail server as an e-mail attachment.

26. The method of claim 14 wherein said step of delivering said protected message file comprises streaming said protected message file from a streaming media server, wherein said notification message provides a stream identification, and wherein said streaming media server streams said protected message file in response to receiving a stream request including said stream identification.

* * * * *